United States Patent
Robotta et al.

(10) Patent No.: US 12,332,052 B2
(45) Date of Patent: Jun. 17, 2025

(54) METHOD AND DEVICE FOR DETERMINING CENTERS OF A HOLLOW SHAFT ROTATABLY CLAMPED AS A WORKPIECE IN A MACHINE TOOL

(71) Applicant: NSH TECHNOLOGY GMBH, Chemnitz (DE)

(72) Inventors: Reinhard Robotta, Erlau (DE); Moritz Halle, Chemnitz (DE); Klaus Kräher, Chemnitz (DE); Hans J. Naumann, Chemnitz (DE)

(73) Assignee: NSH TECHNOLOGY GMBH, Chemnitz (DE)

( * ) Notice: Subject to any disclaimer, the term of this patent is extended or adjusted under 35 U.S.C. 154(b) by 280 days.

(21) Appl. No.: 17/920,464

(22) PCT Filed: Apr. 8, 2021

(86) PCT No.: PCT/DE2021/000071
§ 371 (c)(1),
(2) Date: Oct. 21, 2022

(87) PCT Pub. No.: WO2021/213564
PCT Pub. Date: Oct. 28, 2021

(65) Prior Publication Data
US 2023/0152079 A1    May 18, 2023

(30) Foreign Application Priority Data
Apr. 22, 2020  (DE) .................. 10 2020 002 421.1

(51) Int. Cl.
*G01B 7/31*    (2006.01)
*G01B 7/13*    (2006.01)
*G01B 7/28*    (2006.01)

(52) U.S. Cl.
CPC ................ *G01B 7/31* (2013.01); *G01B 7/13* (2013.01); *G01B 7/281* (2013.01)

(58) Field of Classification Search
CPC . G01B 7/31; G01B 7/13; G01B 7/281; G01B 7/28
See application file for complete search history.

(56) References Cited

U.S. PATENT DOCUMENTS 3,341,947 A * 9/1967 Berryman ................. G01B 5/08
                                                    33/775
4,327,590 A * 5/1982 Kovari ..................... G01B 7/24
                                                    73/784

(Continued)

FOREIGN PATENT DOCUMENTS

DE    4028522 A1 *  3/1992
DE    19958373 A1   6/2001

(Continued)

OTHER PUBLICATIONS

International Search Report (German and English) and Written Opinion (German) of the ISA issued in PCT/DE2021/000071, mailed Sep. 8, 2021; ISA/EP.

*Primary Examiner* — Octavia Hollington
(74) *Attorney, Agent, or Firm* — Harness, Dickey & Pierce, P.L.C.

(57) ABSTRACT

A machine tool and a method for aligning a workpiece with an axis of rotation of the machine tool that accommodates the workpiece defined by a hollow shaft including an annular workpiece contour extending a length of the workpiece. The workpiece is clamped to a chuck and supported by clamping supports that engage the outer surface of the workpiece. A moveable tool carrier supports at least one sensor and is operable to position the sensor in proximity to the annular workpiece contour along its length. The sensor measures a distance between the sensor and the workpiece (Continued)

contour over a plurality of defined angles of the annular workpiece contour and at a plurality of locations along the length to obtain measurement data that is used to determine an approximated longitudinal central axis of the workpiece that is aligned with the axis of rotation of the machine tool.

18 Claims, 8 Drawing Sheets

(56) References Cited

U.S. PATENT DOCUMENTS

| | | | | |
|---|---|---|---|---|
| 6,128,985 | A * | 10/2000 | Muster | B23Q 1/5468 82/131 |
| 9,027,448 | B2 * | 5/2015 | Koll | G05B 19/182 82/47 |
| 2013/0333531 | A1 | 12/2013 | Koll | |
| 2020/0103219 | A1 | 4/2020 | Watanabe et al. | |

FOREIGN PATENT DOCUMENTS

| | | | |
|---|---|---|---|
| EP | 0328896 | A1 * | 8/1989 |
| EP | 2527084 | A2 | 11/2012 |
| EP | 2572826 | A1 | 3/2013 |
| EP | 2668547 | B1 | 3/2015 |
| EP | 3628963 | A1 | 4/2020 |
| WO | WO-2012100278 | A1 | 8/2012 |

* cited by examiner

METHOD AND DEVICE FOR DETERMINING CENTERS OF A HOLLOW SHAFT ROTATABLY CLAMPED AS A WORKPIECE IN A MACHINE TOOL

CROSS-REFERENCE TO RELATED APPLICATIONS

This application is a U.S. National Phase Application under 35 U.S.C 371 of International Application No. PCT/DE2021/000071, filed on Apr. 8, 2021, which claims the benefit of German Patent Application No. 10 2020 002 421.1, filed on Apr. 22, 2020. The entire disclosures of the above applications are incorporated herein by reference.

FIELD

The disclosure relates to a technical solution for determining centers and the spatial course of these centers of a hollow shaft rotatably clamped as a workpiece in a machine tool, which is machined on its outer surface at least in sections.

BACKGROUND

This section provides background information related to the present disclosure which is not necessarily prior art.

It is known to determine centers for bores in a workpiece and to determine the course of the respective bores or centers on the basis of two or more bore centers. For example, when machining longer hollow shafts to accommodate turbine blades, it is necessary to align the averaged axis of the inner cavity with the axis of rotation of the machine tool rotating the hollow shaft. For this purpose, the inner radius of a large number of points inside the hollow shaft is measured and then an alignment of the hollow shaft and the machine tool is realized by means of a mathematically fictitiously determined mean axis. If the inner contour of the bore is measured tactilely, problems often arise due to the length of the tactile measuring elements used and the vibrations that occur. For this reason, other measuring methods are increasingly being used instead of tactile methods.

In EP 2 527 084 A2, for example, it is proposed for the reduction of imbalances that hollow shafts to be machined are first optically scanned in sections and that centers of gravity or imbalances are calculated in sections on the basis of these optically recorded values. These points or sections are subsequently milled in a targeted manner in order to achieve largely optimum concentricity of the hollow shaft for subsequent use.

DE 199 58 373 A1 describes a method for reducing the eccentricity of the inner to the outer surface of a hollow workpiece rotatably clamped in a machine tool. Here, ultrasound is used to determine several measurement data dependent on the contour of the inner surface. These measurement data are used to calculate a nominal course of the outer surface, and the outer surface is subsequently machined according to the calculated nominal course in the same workpiece clamping as during the measurement.

A similar approach is described in EP 2 668 547 B1. Here, however, the measurement data of the contour of the inner surface determined with ultrasound are used for the calculation for a part of the outer surface, which is at least partially machined in a further process step. The workpiece is re-clamped over the partial surfaces generated in this way using clamping devices such as chucks and steady rests, and the other outer surfaces of the workpiece are subsequently machined.

By generating new clamping seats in this way for further machining, largely optimum machining of hollow shafts is possible. However, the use of ultrasound to measure the contours in the inner cavity of larger hollow shafts (e.g. with a length of more than 2 meters) is only possible to a limited extent. This is because the technical complexity of the equipment increases considerably and the measuring accuracy is reduced at the same time. Therefore, in addition to optical and ultrasound-based solutions, the fundamental aim is to modify other measurement methods known per se for such applications.

WO 2012/100 278 A1 describes a method for reducing the eccentricity of the inner to the outer surface of a hollow workpiece rotatably clamped in a machine tool. Here, a user-friendly and fast method for measuring the wall thickness of a workpiece with the aid of an ultrasonic measuring device is described. However, it remains unclear whether the procedure is carried out by contact (tactile) or with the aid of a carrier medium for sound transmission. It is described that the procedure is carried out on the outer surface in the circumferential direction or also preferably in the longitudinal direction of the workpiece. The ultrasonic measuring device is used to record measurement data with which at least one, in this case two, partial surfaces are generated, preferably by axis-parallel rotary milling. With the help of these partial surfaces, the workpiece is clamped in a new setup, but rotated by 180 degrees, which requires a manual operator action or automation and is not explicitly described. The wall thickness determined by the ultrasonic process is subject to the influence of the outer and inner contours and thus also of the clamping device used. Operator actions are required during the process.

Another technical solution for machining a workpiece is described in EP 2 572 826 A1. Here, a tool is used which takes into account the deviation of the actual rotational axis from the nominal rotational axis of a workpiece by feeding the tool with the aid of sensor measurement data. The sensor measurement data are recorded by at least two co-rotating measuring means of known shape. These measuring means are each attached to the end face of the full workpiece and each have an annular and each have an at least partially spherical known shape. Measurement data are recorded by several inductively operating sensors, with the aid of which existing form and position deviations are improved or reduced by machining with a geometrically determined cutting edge in order to meet the highest geometric requirements. The machining process used is not described further. The process requires workpiece preparation on the workpiece face with the measuring equipment to be used. The sensors are aligned with the workpiece through an opening in the clamping device or starting from a tailstock.

SUMMARY

This section provides a general summary of the disclosure, and is not a comprehensive disclosure of its full scope or all of its features.

It is the aim of the disclosure to create a new technical solution for determining centers and the spatial course of these centers of a hollow shaft rotatably clamped as a workpiece in a machine tool using methods other than ultrasound.

This aim is achieved in terms of process technology in that first of all the radial distances between the sensor and the workpiece contour are detected without contact over at least one full angle of the workpiece contour at at least two defined axial positions in defined angular relative positions between the axis of rotation of the sensor and the axis of rotation of the hollow shaft using at least one sensor operating according to the eddy current principle. Then, by calculating any constant radius to the detected radial distances, a vector is formed from polar coordinates with the values angle and radius with radial distances, which is converted into Cartesian coordinates. A geometric workpiece center point assignable to the corresponding axial position of the hollow shaft is calculated via averaging. Then, from at least two such calculated workpiece center points at different axial positions, a center axis lying in space is calculated by a regression analysis, which approximates the workpiece center points. Subsequently, starting from the center axis along the axis of rotation of the hollow shaft, any number of diameters concentric to the center axis is calculated, with which new clamping seats for the hollow shaft are machined, which redefine the axis of rotation of the hollow shaft concentrically to the center axis. In this case, the radial distances at at least two defined axial positions along the axis of rotation of the hollow shaft can be recorded with a sensor one after the other in time. Alternatively, it is also possible for these radial distances to be detected with at least two sensors simultaneously or one after the other in time.

To carry out the method, a device is proposed which is arranged in a fixed or exchangeable manner in the working space of a machine tool with the aid of a holder on a tool carrier and carries one or more sensors operating according to the eddy current principle in the same or definedly different alignment and design and can be freely positioned in the working space via at least one machine axis of the tool carrier. Advantageous embodiments are the subject of subclaims, which are explained in more detail in an embodiment example.

With the technical solution according to the disclosure, a method and a device become available which enable a non-contact measurement in a large measuring range by applying the eddy current principle. Thus, by means of a distance measurement by eddy current technique, the bore centers are measured. Due to the calculation with a virtual diameter, the centers are determined independently of the concrete diameter, whereby inner contours are measured. The vibration-reducing components ensure high measuring accuracy even for long workpieces to be measured. As a result, (spatially) precisely positioned clamping seats and steady rest seats can be created on hollow shafts and similar workpieces, which are used for a new clamping of the workpiece in an optimal spatial orientation for subsequent machining. Thus, a technical solution is created for the generation of clamping seats for a new clamping of a workpiece rotatably clamped in a machine tool with a free contour section in the interior of the workpiece, which is machined on its outer surface at least in sections, wherein the center axis is calculated with the proposed method and the new clamping seats are manufactured with the proposed device. The measuring process as well as the subsequent machining process for producing the new clamping seats is carried out in an unmanned process.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments are explained below with reference to the drawings, wherein.

DETAILED DESCRIPTION

Figure 1A:
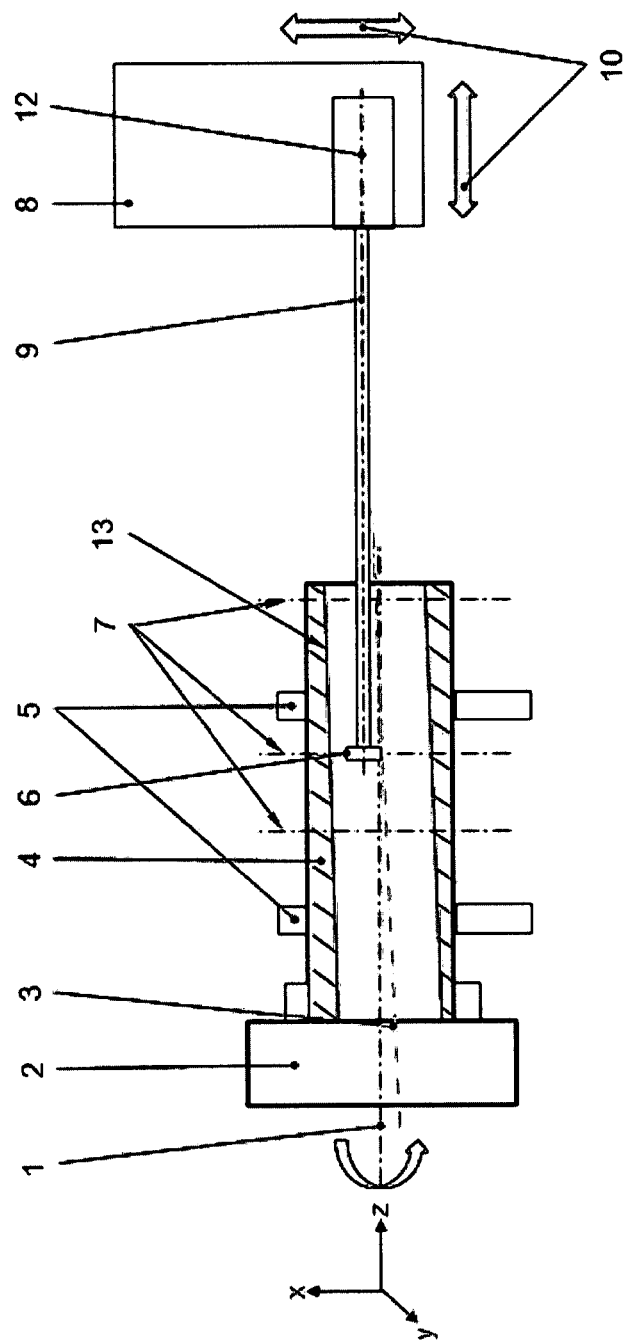
FIG. 1a shows the basic structure with representation of the operative connection of the assemblies during the measurement.

Example embodiments will now be described more fully with reference to the accompanying drawings.

The technical device arrangement shown in the drawings is designed for carrying out a method for determining centers and the spatial course of these centers of a workpiece rotatably clamped in a machine tool with a free contour section in the interior, preferably a hollow shaft, which is machined on its outer surface at least in sections.

According to FIG. 1a, the workpiece, which is designed as a hollow shaft 4, is clamped with an end face section in a clamping means designed as a chuck 2. In addition, the outer surface of the hollow shaft 4 is supported in at least one further clamping means. In the example according to FIG. 1a, however, the support is not provided in just one further clamping means, but in two further clamping means designed as steady rests 5. In this supported position, the hollow shaft 4 rotates around the workpiece rotation axis 1. The direction of rotation is shown with a stylized arrow.

FIG. 1a also shows that the workpiece contour 13 is not concentric. Rather, the outer contour and the inner contour of the hollow shaft 4 run eccentrically to each other. To ensure that correct machining is nevertheless possible, centers are first determined for the hollow interior of the hollow shaft 4.

Figure 2:
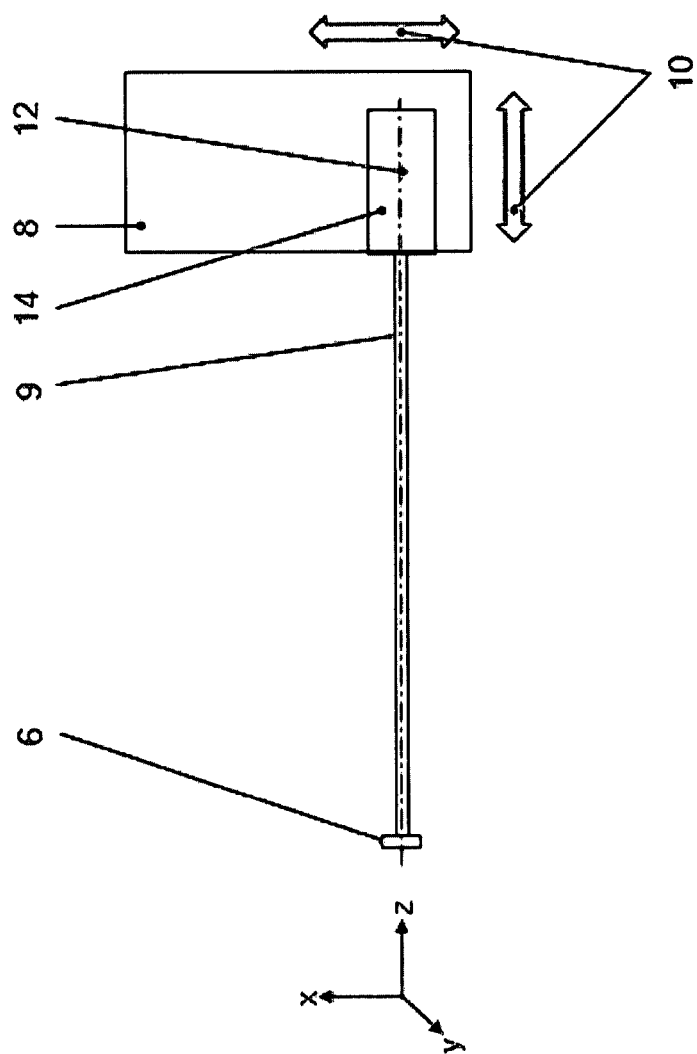
FIG. 2 shows the basic structure of the device for measured value acquisition.

A device 9 shown on the right in FIG. 1a is provided for this purpose, the basic structure of which is again shown separately in FIG. 2. The device 9 is arranged in the working area of a machine tool, which is not shown in more detail here, with the aid of a holder 14 on a tool carrier 8. Both a fixed and an exchangeable arrangement are possible, with the exchangeable variant being advantageous due to the possible use of cassettes. The machine axes of the tool carrier 8 are shown with two stylized arrows 10.

At least one sensor 6 operating according to the eddy current principle is arranged on the device 9. The axis of rotation referred to the sensor 6 is marked with the reference sign 12. However, the sensor 6 itself does not rotate about this axis of rotation 12. If the device 9 is equipped with several sensors 6, sensors 6 of the same or different design can be provided for this purpose. Likewise, the multiple sensors 6 can be arranged in the same or defined different orientation. Regardless of the specific number, design and orientation, each sensor 6 can be freely positioned in the working area of the machine tool via at least one machine axis 10 of the tool carrier 8.

In the embodiment shown, only one sensor 6 is provided. With this sensor 6, which operates according to the eddy current principle, the radial distances between the sensor 6 and the workpiece contour 13 are detected at at least two defined axial positions 7. FIG. 1a shows three positions in this respect, whereby the sensor 6 is located here at the middle axial position 7 as an example. The contactless detection of the radial distances takes place in defined angular relative positions between the axis of rotation 12 of the sensor 6 and the axis of rotation 1 of the workpiece 4 over at least one full angle of the workpiece contour 13.

If only one sensor 6 is used, the radial distances are detected at at least two defined axial positions 7 along the axis of rotation 1 of the hollow shaft 4 in succession. If, on the other hand, several sensors 6 are present, the radial distances are also recorded either in succession or, advantageously, simultaneously.

Figure 3:
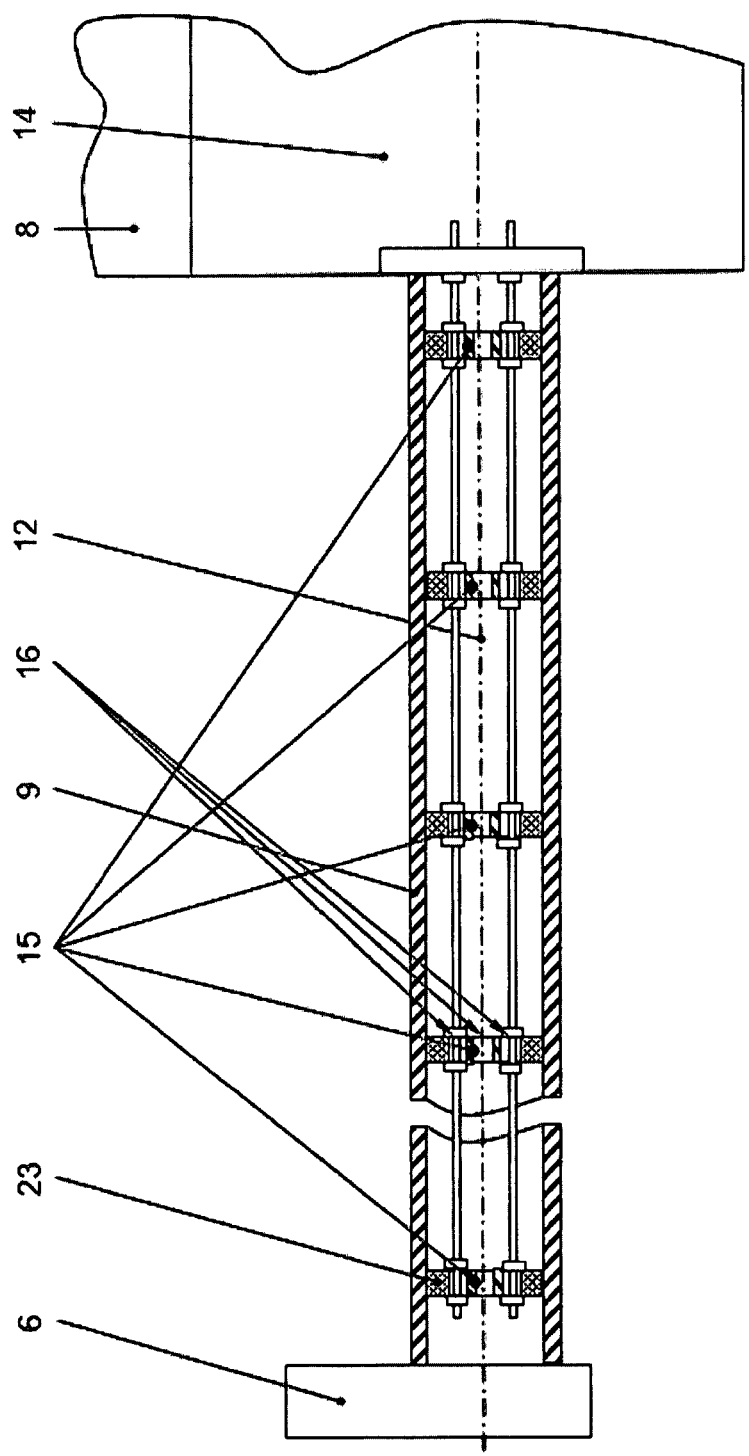
FIG. 3 shows a representation of the vibration reducing components.

A qualitatively good recording of measured values is achieved if additional vibration-reducing components are assigned to the device 9. According to FIG. 3, several disk-like components 15 are structurally integrated in the interior of the device 9 for this purpose. These components 15 each have an elastic component in the circumferential direction which is radially braced with the device 9. The vibration-reducing components 15 also have centrally and/or eccentrically arranged openings 16 for axial feed-through and attachment of cables and lines. Furthermore, it is provided that at least one vibration-reducing component 15 is rigidly connected to at least one adjacent vibration-reducing component 15 and is attached to the holder 14 to the tool carrier 8. As a result, the at least one sensor 6 rotating about the axis of rotation 12 performs very precise movements without deflections affecting the measurement.

The device 9 can be further designed to achieve a largely optimum adaptation for specific application requirements in each case. For example, the device 9 can be arranged on an extendable sensor carrier for hollow shafts 4 with long cavities. Furthermore, the energy required to operate the device 9 can be supplied either contactlessly or by cable. In this case, a contactless energy supply is designed, for example, as an inductive power supply. Furthermore, the measurement data acquired by means of the device 9 can be transmitted contactlessly or by cable to a computing unit with which the measurement data can be transmitted to a further computing unit of a control system of the associated machine tool.

As soon as the radial distances between sensor 6 and workpiece contour 13 have been detected, a vector of polar coordinates with the values angle and radius with radial distances is formed by calculating any constant radius with the detected radial distances. This vector is converted into Cartesian coordinates and a geometric workpiece center point assignable to the corresponding axial position 7 of the hollow shaft 4 is calculated by averaging. Then, from at least two calculated workpiece center points at different axial positions 7, a center axis 3 lying in space is calculated by a regression analysis, which approximates the workpiece center points. Subsequently, starting from the center axis 3 along the axis of rotation 1 of the hollow shaft 4, any number of diameters concentric to the center axis 3 are calculated.

Figure 1B:
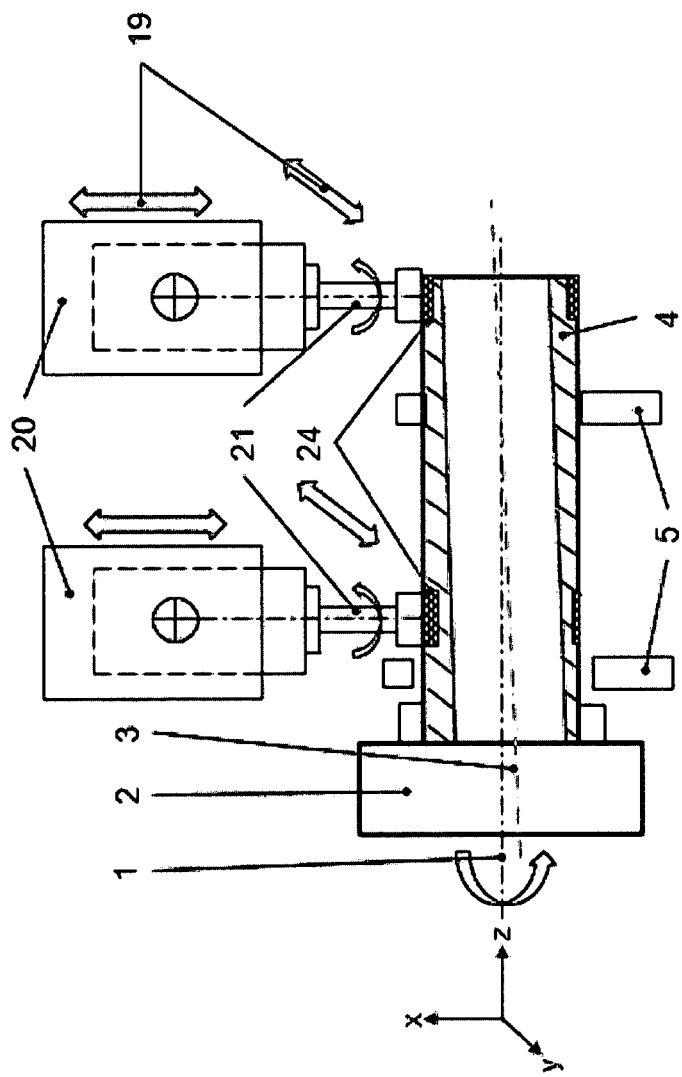
FIG. 1b shows a representation of the effective connection of the assemblies during the milling of new clamping seats concentric to the calculated center axis.

With the diameters calculated in this way, new clamping seats are machined for the hollow shaft 4, which redefine the axis of rotation 1 of the hollow shaft 4 concentrically to the center axis 3. This process step is shown in FIG. 1b. The hollow shaft 4 continues to be clamped with a front end section in the clamping means designed as chuck 2 and rotates about the axis of rotation 1. In addition, the hollow shaft 4 is still supported with its outer surface in the steady rest 5 shown on the right, but no longer in the steady rest 5 shown on the left. The new clamping seats 24 are rotationally milled concentrically to the calculated center axis 3 orthogonally. Preferably, each new clamping seat 24 is created with a turning/drilling/milling unit 20 by a respective associated milling tool 21. The traversing axes of the turning/drilling/milling units 20 are each shown with two stylized arrows 19.

Figure 1C:
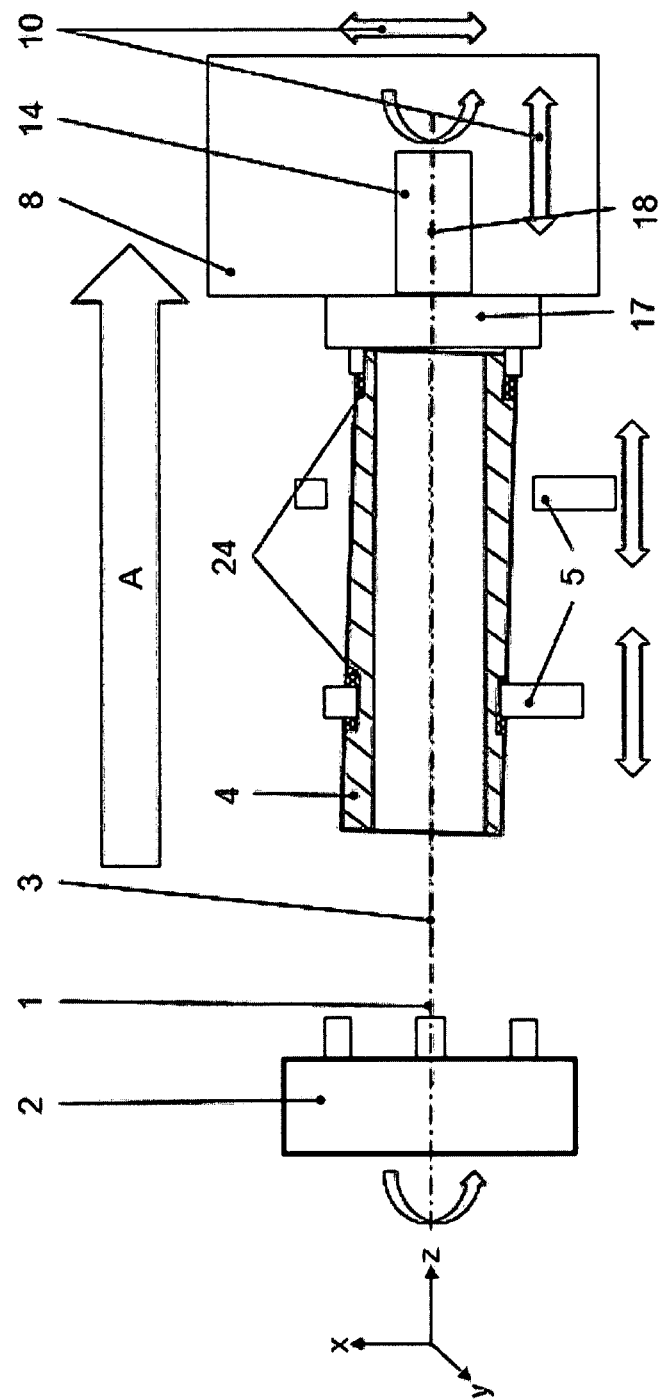
FIG. 1c shows a representation of the effective connection of the assemblies during chucking of the hollow shaft.
Figure 4:
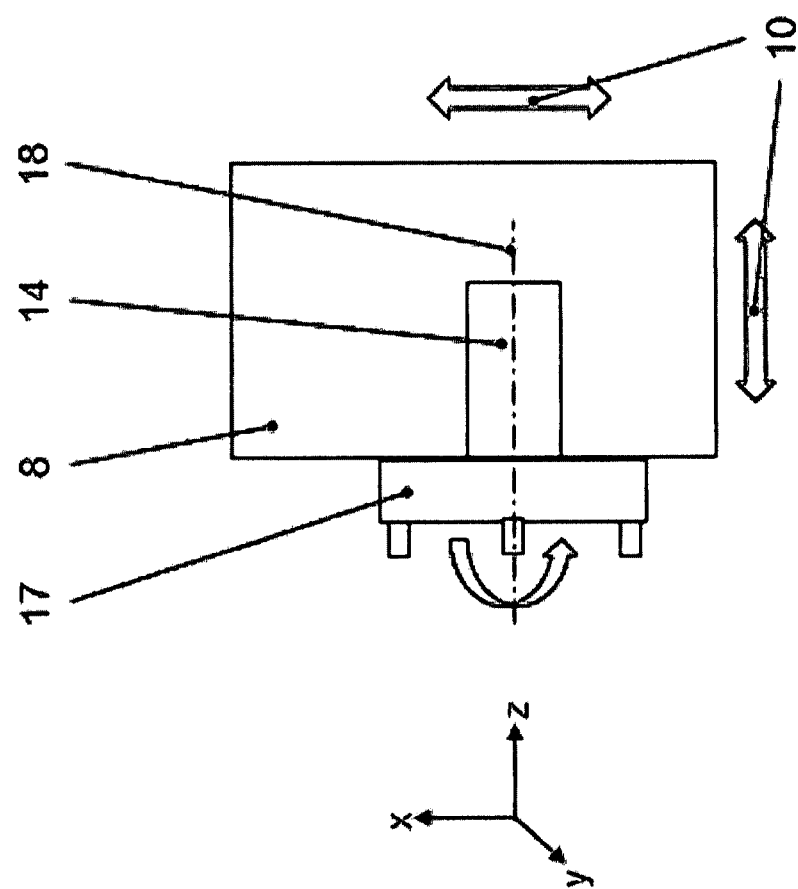
FIG. 4 shows the structure of the device in a modified version.

After the new clamping seats 24 are machined, the chucking of the hollow shaft 4 takes place. This process step is shown in FIG. 1c, where the arrow marked "A" stylizes the chucking of the hollow shaft 4 and a simultaneous process so that new clamping seats can be milled. For this purpose, the tool carrier 8 comprises a rotatable clamping means 17, which is designed to be selectively drivable and lockable. The clamping means 17 is designed for an inner or outer receptacle of the hollow shaft 4 and can be actuated manually or automatically. The clamping means 17 is freely positionable in the working space of the machine tool via at least one machine axis 10 of the tool carrier 8. FIG. 4 shows this equipment design again separately.

According to FIG. 1c, the hollow shaft 4 is released from the clamping means designed as chuck 2 and is supported on the new clamping seats via the steady rest 5 shown on the left and the clamping means 17 on the tool carrier 8. The clamping device 17 rotates about a rotation axis 18 so that the hollow shaft 4 also executes a rotating movement. In this clamping situation, the workpiece rotation axis 1, center axis 3 and clamping device rotation axis 18 are congruent with each other.

Figure 1D:
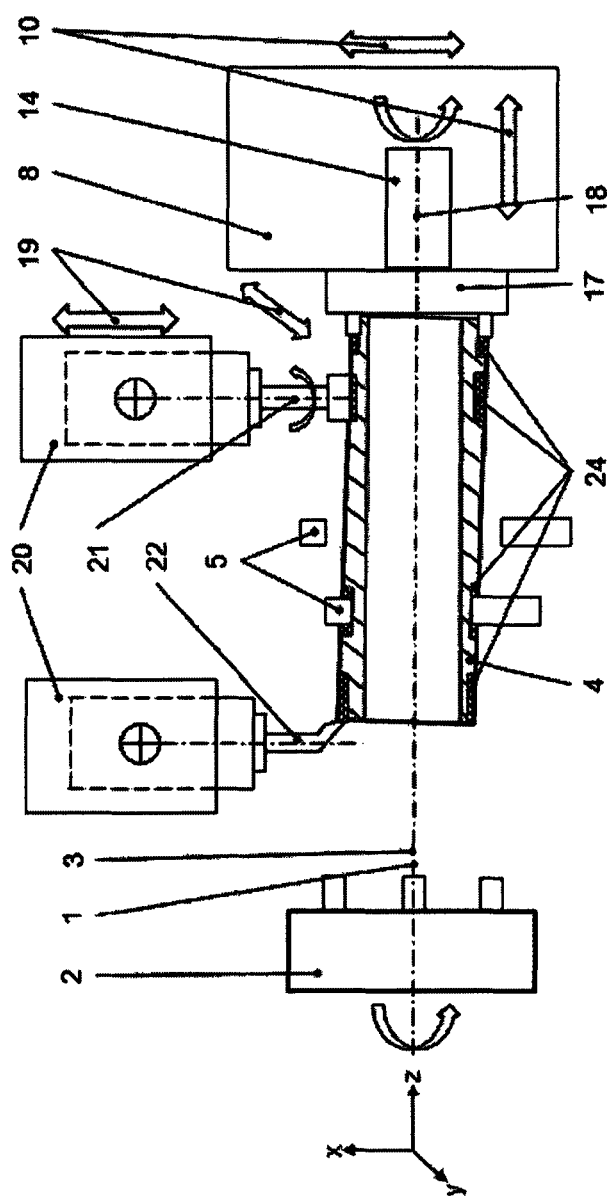
FIG. 1d shows a representation of the effective connection of the assemblies during the milling and turning of new clamping seats for further machining.

This is followed by milling and turning of new clamping seats 24 for further machining. This process step is shown in FIG. 1d. The hollow shaft 4 is further released from the clamping means designed as chuck 2 and supported via the steady rest 5 shown on the left and the clamping means 17. The turning/drilling/milling units 20 already explained for FIG. 1b are used for machining. Instead of two milling tools 21, one milling tool and one turning tool 22 are now used, for example.

Figure 1E:
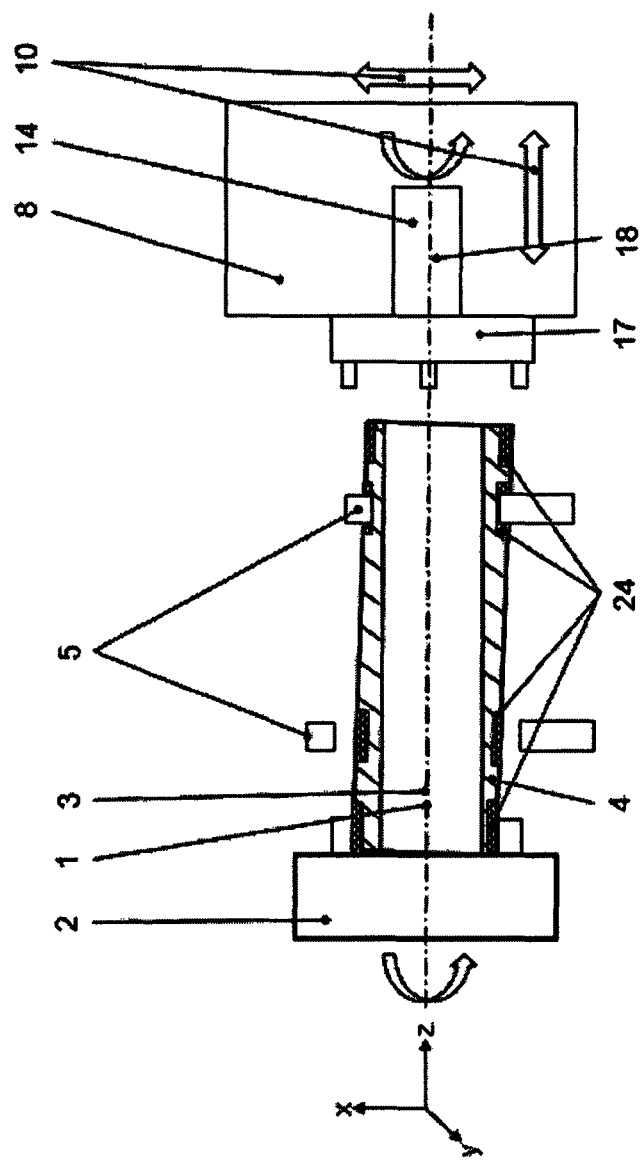
FIG. 1e shows a representation of the effective connection of the assemblies in a new clamping situation.

FIG. 1e shows the clamping situation after milling and turning the new clamping seats 24. The hollow shaft 4 is now clamped again in the clamping means designed as chuck 2 and rotates about the workpiece rotation axis 1, which is congruent with the calculated center axis 3. In addition, the hollow shaft 4 is supported with its outer surface in the steady rest 5 shown on the right, but not in the steady rest 5 shown on the left.

The foregoing description of the embodiment has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for aligning a workpiece with an axis of rotation of a machine tool, wherein the workpiece comprises a longitudinally-extending, hollow shaft defining an outer surface and an inner cavity comprising an annular workpiece contour extending for a length of the workpiece, wherein a first end of the workpiece is engaged with a first rotatable chuck of the machine tool and the workpiece is supported by a first clamping support and a second clamping support of the machine tool that engage the outer surface of the workpiece, the method comprising:
   (a) positioning at least one sensor supported by a tool carrier of the machine tool in proximity to the annular workpiece contour;
   (b) measuring, with the at least one sensor, a distance between the at least one sensor and the workpiece contour, wherein measuring the distance is carried out over a plurality of defined angles of the annular workpiece contour and at a plurality of locations along the length of the workpiece to obtain measurement data;
   (c) calculating a geometric center point of the workpiece at each of two or more of the plurality of locations along the length of the workpiece to obtain two or more geometric center points of the workpiece;
   (d) calculating an approximated longitudinal central axis of the workpiece from the two or more geometric center points of the workpiece;
   (e) disengaging the first clamping support from the outer surface of the workpiece;
   (f) machining a plurality of first clamping seats in the outer surface of the workpiece and radially concentric to the approximated longitudinal central axis of the workpiece;
   (g) engaging the first clamping support with a first one of the plurality of first concentric clamping seats in the outer surface of the workpiece;
   (h) disengaging the second clamping support from the outer surface of the workpiece;
   (i) disengaging the first end of the workpiece from the first rotatable chuck of the machine tool;
   (j) engaging a second end of the workpiece with a second rotatable chuck of the machine tool, wherein the second end of the workpiece comprises a second one of the plurality of first concentric clamping seats in the outer surface of the workpiece;
   (k) machining a plurality of second clamping seats in the outer surface of the workpiece and radially concentric to the approximated longitudinal central axis of the workpiece;
   (l) engaging the second clamping support with a first one of the plurality of second concentric clamping seats in the outer surface of the workpiece;
   (m) disengaging the first clamping support from the first one of the plurality of first concentric clamping seats in the outer surface of the workpiece;
   (n) disengaging the second end of the workpiece from the second rotatable chuck of the machine tool; and
   (o) engaging the first end of the workpiece with the first rotatable chuck of the machine tool, wherein the first end of the workpiece comprises a second one of the plurality of first concentric clamping seats in the outer surface of the workpiece.

2. The method according to claim 1, wherein measuring the distance at the plurality of locations along the length of the workpiece is carried out successively in time by a single sensor.

3. The method according to claim 1, wherein measuring the distance at the plurality of locations along the length of the workpiece is carried out by at least two sensors simultaneously.

4. The method according to claim 1, wherein measuring the distance at the plurality of locations along the length of the workpiece is carried out by at least two sensors successively in time.

5. The method according to claim 1, wherein each of the first concentric clamping seats and the second concentric clamping seats is rotationally milled in the outer surface of the workpiece in a direction that is orthogonal to the approximated longitudinal central axis of the workpiece.

6. The method according to claim 1, wherein the step of calculating the geometric center point of the workpiece at each of two or more of the plurality of locations along the length of the workpiece comprises:
   generating polar coordinates utilizing the measurement data;
   converting the polar coordinates to Cartesian coordinates; and
   calculating the geometric center point by averaging.

7. The method according to claim 1, wherein calculating the approximated longitudinal central axis of the workpiece is performed using a regression analysis which approximates the geometric center points of the workpiece.

8. The method according to claim 1, wherein the at least one sensor is an eddy current sensor.

9. A machine tool for aligning a workpiece with an axis of rotation of the machine tool, wherein the workpiece comprises a longitudinally-extending, hollow shaft defining an outer surface and an inner cavity comprising an annular workpiece contour extending for a length of the workpiece, the machine tool comprising:
   a tool carrier moveable along at least one machine axis;
   at least one eddy current sensor supported by the tool carrier;
   wherein the tool carrier is operable to position the at least one sensor in proximity to the annular workpiece contour;
   wherein the at least one sensor is operable to measure a distance between the at least one sensor and the annular workpiece contour over a plurality of defined angles of the annular workpiece contour and at a plurality of locations along the length of the workpiece and obtain measurement data; and
   a control system, wherein the control system calculates a geometric center point of the workpiece at each of two or more of the plurality of locations along the length of the workpiece to obtain two or more geometric center points of the workpiece and calculates an approximated longitudinal central axis of the workpiece from the two or more geometric center points.

10. The machine tool of claim 9, further comprising:
   a first rotatable chuck operable to engage a first end of the workpiece;
   a plurality of clamping supports operable to engage the outer surface of the workpiece; and
   wherein the tool carrier further comprises a second rotatable chuck operable to engage a second end of the workpiece.

11. The machine tool of claim 9, wherein the tool carrier further comprises a sensor carrier;

wherein the sensor carrier comprises vibration-reducing components including a plurality of disk-like components structurally integrated in an interior of the sensor carrier and comprising an elastic component which is circumferentially braced in the sensor carrier;

wherein the plurality of disk-like components include openings to accommodate cables and lines therethrough; and wherein adjacent disk-like components are attached to one another and to the tool carrier.

12. The machine tool of claim 9, wherein the tool carrier comprises a clamp for receiving a hollow shaft internally or externally;

wherein the clamp is rotatable about an axis of rotation and is operable to be driven for rotation or locked against rotation;

wherein the clamp is operable to be actuated manually or automatically;

wherein the clamp is operable to be freely positioned in a working space of the machine tool along at least one machine axis of the tool carrier.

13. The machine tool of claim 9 wherein the tool carrier further comprises a sensor carrier;

wherein the machine tool further comprises a plurality of vibration-reducing components that are structurally integrated into the sensor carrier, wherein each of the plurality of vibration-reducing components is disk-shaped, wherein an elastic component positioned about a circumference of each disk-shaped component is radially clamped to the sensor carrier.

14. The machine tool of claim 13 wherein the plurality of vibration-reducing components have centrally and/or eccentrically arranged openings to accommodate axial feed-through and fastening of cables and lines.

15. The machine tool of claim 13 wherein at least one vibration-reducing component is connected to at least one adjacent vibration-reducing component and to a holder to the tool carrier.

16. The machine tool of claim 13, wherein the sensor carrier is longitudinally extensible.

17. The machine tool of claim 9, wherein energy needed for the operation of the at least one sensor is provided by one of a wired power supply or a wireless power supply.

18. The machine tool of claim 17, wherein the wireless power supply comprises an inductive power supply.

* * * * *